(12) United States Patent
Murthy Manda et al.

(10) Patent No.: US 10,719,359 B2
(45) Date of Patent: Jul. 21, 2020

(54) PERIODIC TASK EXECUTION IN AN AUTOMATED CONTEXT

(71) Applicant: ServiceNow, Inc., Santa Clara, CA (US)

(72) Inventors: Venkata Satya Sai Rama Murthy Manda, Bellevue, WA (US); Peng Wang, Bellevue, WA (US)

(73) Assignee: ServiceNow, Inc., Santa Clara, CA (US)

( * ) Notice: Subject to any disclaimer, the term of this patent is extended or adjusted under 35 U.S.C. 154(b) by 128 days.

(21) Appl. No.: 15/969,570

(22) Filed: May 2, 2018

(65) Prior Publication Data

US 2019/0340026 A1 Nov. 7, 2019

(51) Int. Cl.
*G06F 9/48* (2006.01)
*G06F 11/00* (2006.01)
*G06F 11/30* (2006.01)

(52) U.S. Cl.
CPC .............. *G06F 9/4887* (2013.01); *G06F 9/48* (2013.01); *G06F 9/4843* (2013.01); *G06F 9/4881* (2013.01); *G06F 11/00* (2013.01); *G06F 11/30* (2013.01)

(58) Field of Classification Search
CPC ........ G06F 9/48; G06F 9/4843; G06F 9/4881; G06F 9/4887; G06F 11/00; G06F 11/30
See application file for complete search history.

(56) References Cited

U.S. PATENT DOCUMENTS

| | | | |
|---|---|---|---|
| 6,862,540 B1* | 3/2005 | Welch ................... | G01F 15/063 340/870.02 |
| 2005/0039086 A1* | 2/2005 | Krishnamurthy ..... | H04L 41/142 714/57 |
| 2006/0156064 A1* | 7/2006 | Damani ............... | G06F 11/1471 714/16 |
| 2008/0189709 A1* | 8/2008 | Amin .................... | G06F 9/5066 718/102 |
| 2011/0246144 A1* | 10/2011 | Tanaka ............... | A61B 5/04012 703/2 |
| 2011/0276832 A1* | 11/2011 | Schneider .......... | G05B 23/0229 714/37 |
| 2011/0321051 A1* | 12/2011 | Rastogi ................. | G06F 9/4881 718/102 |
| 2012/0245870 A1* | 9/2012 | Komano ................ | G01R 22/10 702/62 |
| 2014/0032506 A1 | 1/2014 | Hoey et al. | |
| 2015/0269241 A1* | 9/2015 | Lee ....................... | G06F 16/285 707/737 |

(Continued)

OTHER PUBLICATIONS

Create Time Series Reports from MetricBase Data, 2017, https://docs.servicenow.com/bundle/kingston-performance-analytics-and-reporting/page/use/reporting/task/create-report-with-metricbase-data.html.

*Primary Examiner* — Charles M Swift

(74) *Attorney, Agent, or Firm* — Fletcher Yoder PC

(57) ABSTRACT

A computing system may run a recurring task, which may use resources, such as logic resources and time, to operate on and/or with a set of data. Accordingly, the frequency at which the recurring task is executed may limit the performance and/or efficiency of the computing system. As such, a scheduler routine may, based on configuration information associated with the recurring task and/or the set of data, schedule the recurring task with a periodicity that may improve the performance and/or efficiency of the computing system.

20 Claims, 8 Drawing Sheets

(56) References Cited

U.S. PATENT DOCUMENTS

2017/0046309 A1* 2/2017 Hubauer ............ G05B 19/0425
2018/0018436 A1* 1/2018 Opitz ..................... G16H 10/60
2018/0157535 A1* 6/2018 Dushok ................... G06F 9/485
2018/0324769 A1* 11/2018 Hosseini ............... H04L 5/0048

* cited by examiner

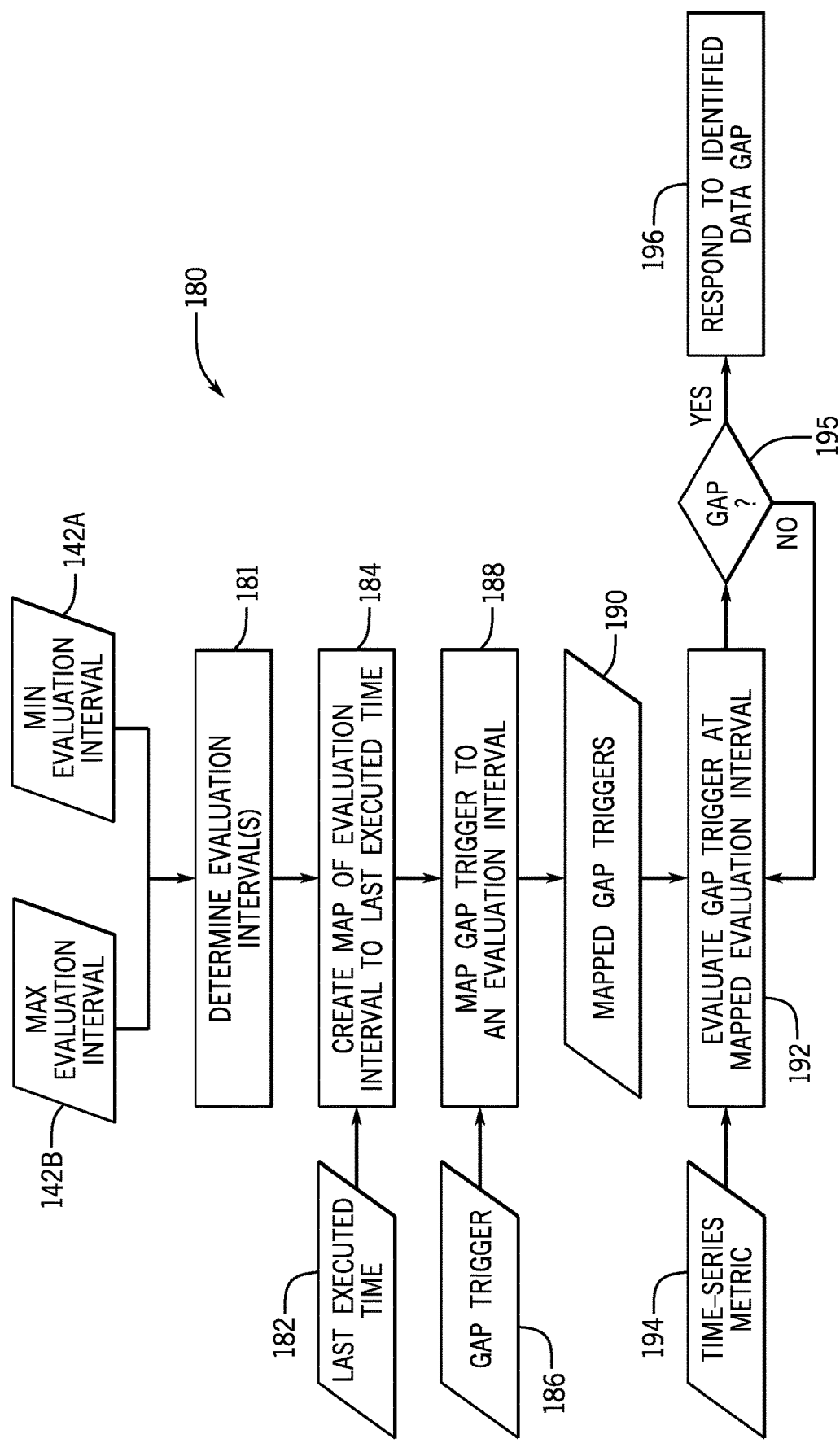

PERIODIC TASK EXECUTION IN AN AUTOMATED CONTEXT

BACKGROUND

The present disclosure relates generally to scheduling a recurring automated task. More particularly, the present disclosure relates to efficiently scheduling a recurring task based on configuration data associated with the recurring task.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

To execute a task, a computing system may use resources, such as logic resources and time, that may otherwise be dedicated to performing additional operations. As such, in the case of a recurring task, the frequency at which the task is executed may determine how often these resources are diverted from performing the additional operations. Accordingly, executing the task with increasing frequency, which may provide finer granularity to results of the task, may become increasingly cumbersome to the efficiency of the computing system and its execution of the additional operations.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

A computing system, such as a database, may run a recurring task or job, which upon execution, may perform an operation, such as detecting data and/or a change in data. Accordingly, the task may be scheduled to execute with a periodicity to suitably perform the operation. In the case of detecting a change in data, for example, the task may be scheduled to execute with a frequency suitable (e.g., high enough) to capture each change in data that occurs or changes in a trend captured by the data. However, while executing the task with an increased frequency may provide finer granularity to results of the operation performed by the task, increasing the frequency of executing the task may use resources, such as logic resources and time, of the computing system that may otherwise be dedicated to performing additional operations.

Accordingly, efficiently scheduling the recurring task may involve determining a periodicity for the task that is suitable to perform the operation while limiting the use of resources in the computing system. To do so, the periodicity may be determined based at least in part on one or more parameters, e.g., configuration data that may in some embodiments be specified or selected by a user. The configuration data may, for example, specify a minimum interval (e.g., duration) between executions of the task, a maximum interval between executions of the task, and/or the like. While the minimum interval and the maximum interval may set inclusive boundaries for a duration between consecutive executions of the task, the periodicity of the recurring task may additionally be determined based on the nature of the operation performed by the task. For example, in some embodiments, the task may be scheduled based in part on an expected periodicity and/or duration of data and/or a change in data to be detected by the operation.

BRIEF DESCRIPTION OF THE DRAWINGS

Various aspects of this disclosure may be better understood upon reading the following detailed description and upon reference to the drawings in which:

FIG. 8 is a data flow diagram for efficiently scheduling the recurring task of FIG. 4, in accordance with aspects of the present disclosure.

DETAILED DESCRIPTION OF SPECIFIC EMBODIMENTS

Figure 1:
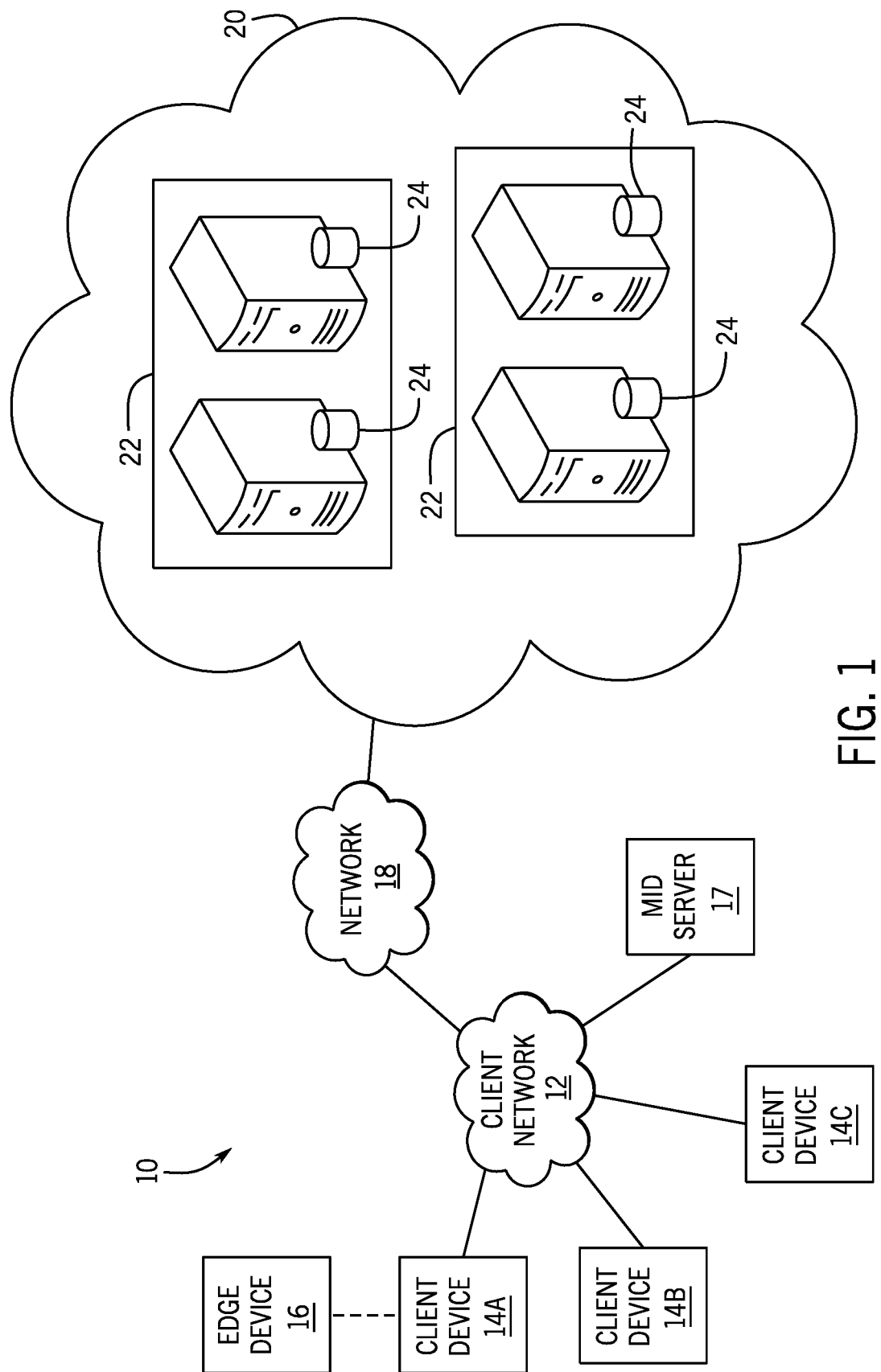
FIG. 1 is a block diagram of an embodiment of a cloud computing system in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "time series" or "time series data" refers to the values of a variable recorded at intervals, typically regular intervals, over a period of time. Examples of such time series data as used herein may include, but are not limited to, values monitored and recorded for an operational parameter of a computing system, database, or network, such as a disk utilization, processor utilization, record locks, network bandwidth, open threads, and so forth To efficiently schedule a recurring task, such as a gap trigger used in the context of time-series data, a computing system may determine a suitable periodicity for the task based on configuration data related to the recurring task and/or an operation performed by the recurring task. The configuration data may, for example, specify a minimum interval (e.g., duration) between executions of the task, a maximum interval between executions of the task, and/or the like. Further, the periodicity of the recurring task may be determined based on the nature of the data and/or the change in data detected, for example, by the operation performed by the task. As such, the task may be scheduled based in part on an expected periodicity and/or duration of the data and/or the change in data to be detected. In any case, based on the configuration data, the task may be scheduled to execute with a periodicity suitable to perform the operation and to limit the resources used by the computing system to execute the task.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and a cloud-based platform 20. In some implementations, the cloud-based platform may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the platform 20. FIG. 1 also illustrates that the client network 12 includes an administrative or managerial device or server, such as a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), IEEE 802.11 networks, and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 is implemented on one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary web server installation), an application server (e.g., unitary JAVA Virtual Machine), and/or a database server, e.g., a unitary relational database management system (RDBMS) catalog.

To utilize computing resources within the platform 20, network operators may choose to configure the data centers 22 using a variety of computing infrastructures. In one embodiment, one or more of the data centers 22 are configured using a multi-tenant cloud architecture, such that one of the server instances 24 handles requests from and serves multiple customers. Data centers with multi-tenant cloud architecture commingle and store data from multiple customers, where multiple customer instances are assigned to one of the virtual servers 24. In a multi-tenant cloud architecture, the particular virtual server 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 24 causing outages for all customers allocated to the particular server instance.

In another embodiment, one or more of the data centers 22 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
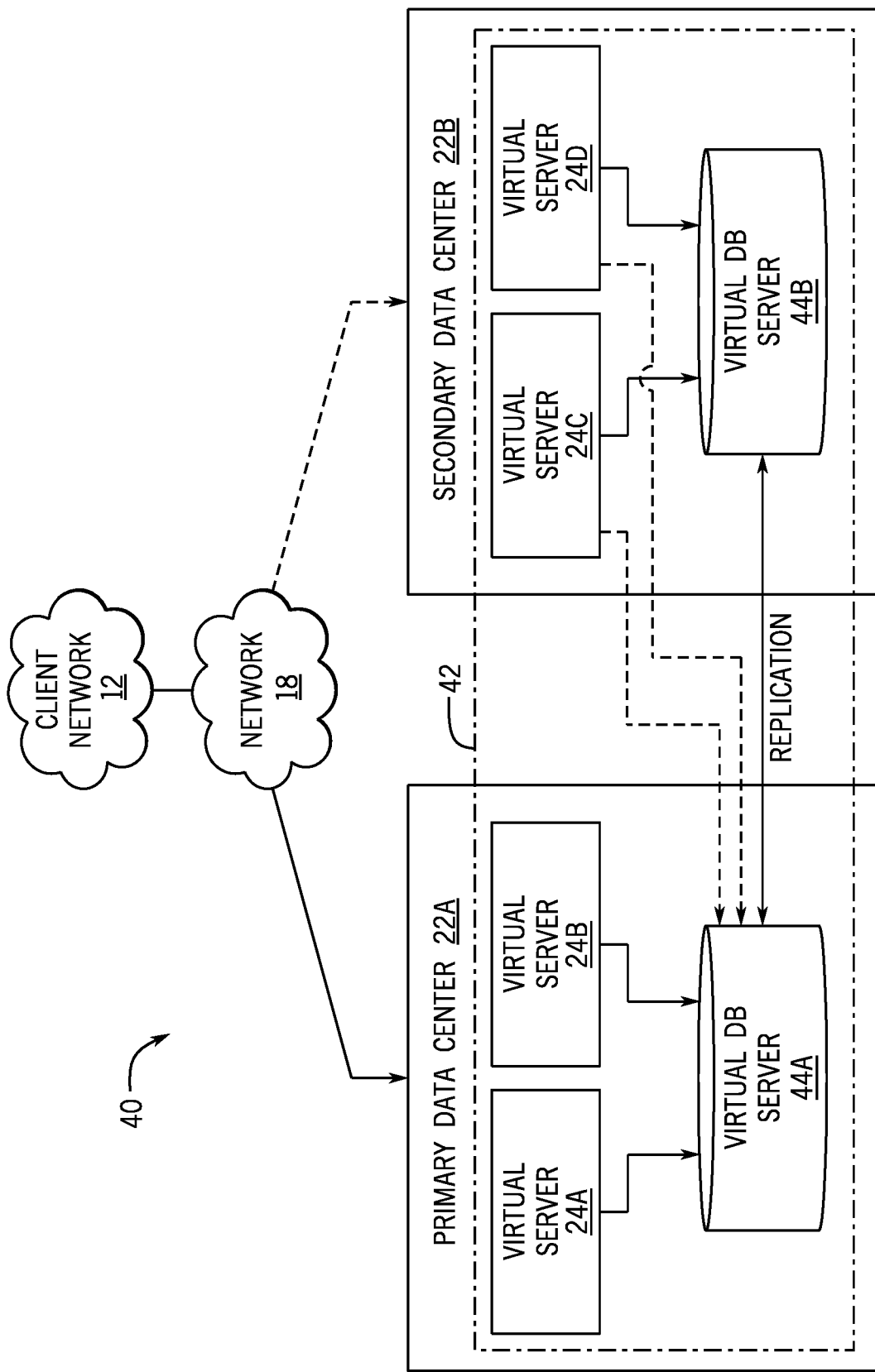
FIG. 2 is a block diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a simply client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

In the depicted example, to facilitate availability of the client instance 42, the virtual servers 24A-24D and virtual database servers 44A and 44B are allocated to two different data centers 22A and 22B, where one of the data centers 22 acts as a backup data center. In reference to FIG. 2, data center 22A acts as a primary data center that includes a primary pair of virtual servers 24A and 24B and the primary virtual database server 44A associated with the client instance 42. Data center 22B acts as a secondary data center 22B to back up the primary data center 22A for the client instance 42. To back up the primary data center 22A for the client instance 42, the secondary data center 22B includes a secondary pair of virtual servers 24C and 24D and a secondary virtual database server 44B. The primary virtual database server 44A is able to replicate data to the secondary virtual database server 44B (e.g., via the network 18).

As shown in FIG. 2, the primary virtual database server 44A may back up data to the secondary virtual database server 44B using a database replication operation. The replication of data between data could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the second data center 22B during a failure and/or maintenance scenario. Using FIG. 2 as an example, if the virtual servers 24A and 24B and/or primary virtual database server 44A fails and/or is under maintenance, data traffic for client instances 42 can be diverted to the secondary virtual servers 24C and/or 24D and the secondary virtual database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 24A-D and virtual database servers 44A and 44B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
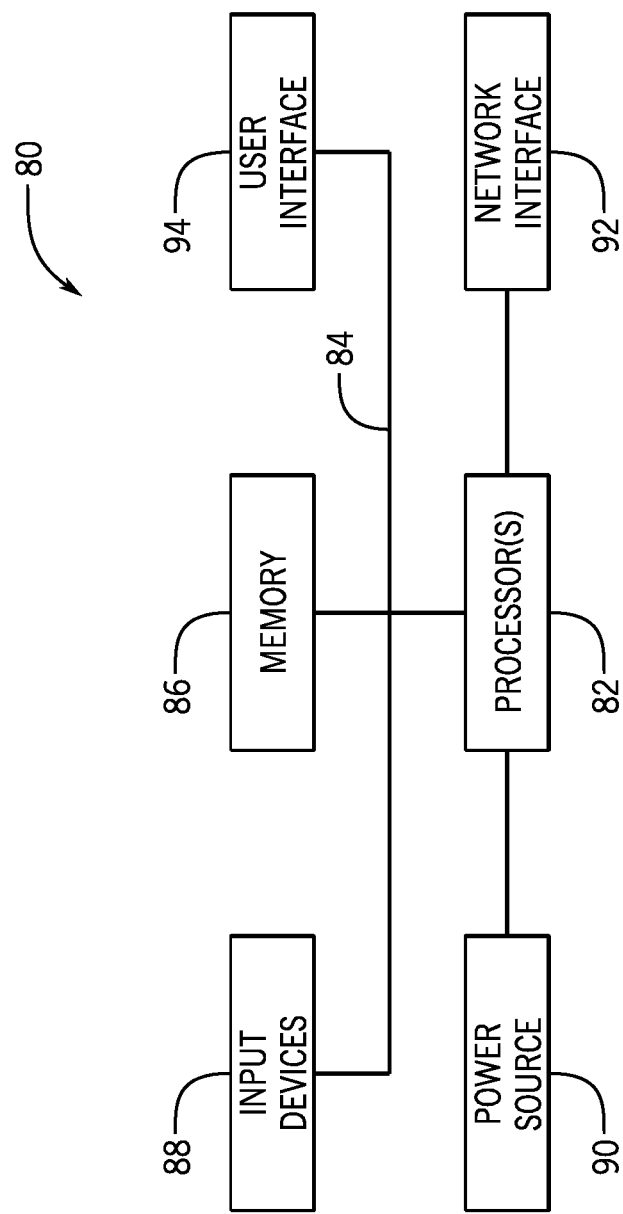
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 includes suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processor 82. For example, the input devices 88 may include a mouse, touchpad, touchscreen, keyboard and the like. The power source 90 can be any suitable source for power of the various components of the computing device 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

As described in further detail below, a computing system 80, such as a database, may run a recurring task. The recurring task, may upon execution, perform an operation, such as detecting data and/or a change in data. To efficiently schedule the recurring task, the computing system 80 determine a suitable periodicity for the task. In some embodiments, the periodicity may be determined based at least in part on configuration data associated with the task. The configuration data may, for example, specify a minimum interval (e.g., duration) between executions of the task, a maximum interval between executions of the task, and/or the like. While the minimum interval and the maximum interval may set inclusive boundaries for a duration between consecutive executions of the task, the periodicity of the recurring task may additionally or alternatively be determined based on the nature of the data and/or the change in data detected by the task. For example, in some embodiments, the task may be scheduled based in part on a level of importance, a duration, and/or an expected periodicity of the data and/or the change in data to be detected. More specifically, in some cases, the level of importance of the data and/or the change in data may be time (e.g., duration) dependent, and in such cases, the recurring task may be scheduled to detect each of the levels of importance associated with the data as the data transitions between the levels. That is, as described in further detail below, the task may be scheduled with a frequency suitable to capture each of the levels of importance associated with the data without skipping or aliasing any of the levels.

As an illustrative embodiment, scheduling the recurring task is described below in the context of implementing a gap trigger in a database. A gap trigger may be a trigger in a database that may perform an operation upon identification of a gap exceeding and/or meeting a threshold duration between data received at the database (e.g., a data gap). In some embodiments, the gap trigger may be scheduled as the recurring task. That is, the gap trigger may be evaluated with a scheduled periodicity to identify the data gap and to respond to the identified data gap, such as may be present in a series of sequential observations or data points, e.g., a set of time-series data. On the other hand, in some embodiments, a recurring task, such as a scheduled job, a temporal trigger, and/or the like, may handle identification of the data gap, and in response to the identification, the gap trigger may be evaluated. In any case, the description of scheduling a gap trigger is intended to be illustrative, not limiting. Accordingly, the techniques described herein may be applied to any suitable recurring task, such as a scheduled job, a temporal trigger, and/or the like.

Figure 4:
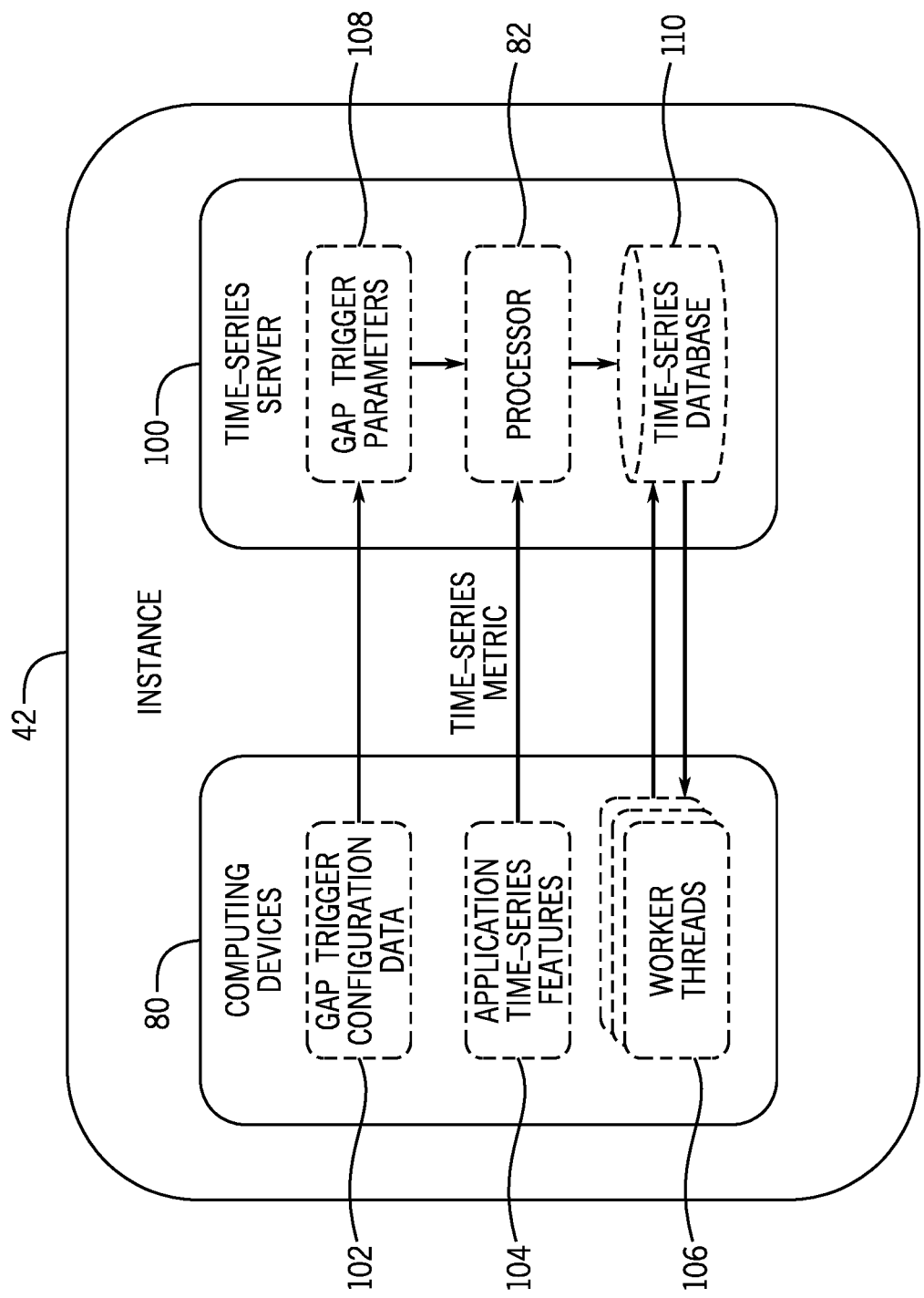
FIG. 4 is an embodiment of a client instance that efficiently schedules a recurring task to evaluate a gap trigger, in accordance with aspects of the present disclosure.

Turning now to FIG. 4, a client instance 42 configured to efficiently schedule a recurring task to evaluate a gap trigger is illustrated. The client instance 42 may include and/or communicate with a computing system 80 and/or a virtual server 24, such as a time-series server 100. The computing system 80 may include configuration data 102 (here denoted as gap trigger configuration data), which may be stored in memory 86.

The configuration data 102 may include, for example, a minimum interval (e.g., period) between task executions (e.g., a minimum evaluation interval), a maximum interval between task executions (e.g., a maximum evaluation interval), information related to data detected and/or evaluated by the recurring task, and/or the like. For example, a minimum evaluation interval of five minutes and a maximum evaluation interval of thirty minutes may indicate that a gap trigger associated with the configuration data 102 may be executed (e.g., evaluated) between every five and thirty minutes, inclusively. Further, the information related to the data detected and/or evaluated may indicate what data (e.g., metric) out of a set of data may be detected and/or evaluated by the recurring task. That is, for example, the configuration data 102 may indicate a metric the gap trigger is performed on. Further, information related to data detected and/or evaluated may include trigger levels each corresponding to a respective data gap duration and/or a minimum data gap duration between each of the trigger levels. For example, identification of a data gap in the evaluated data set (e.g., metric) having a first duration may be handled with a first response, as indicated by a first trigger level, while identification of a data gap having a second duration may be handled with a second response, as indicated by a second trigger level. Further, the minimum data gap duration (e.g., minimum gap duration) may indicate the minimum duration of a data gap that the gap trigger may respond to and/or may indicate the minimum difference between data gap durations mapped to the trigger levels, such as the first trigger level and the second trigger level.

The configuration data 102 may be modified in response to an input received at the computing system 80 via, for example, the user interface 94 and/or the input devices 88. Accordingly, the configuration data 102 may be determined and/or received based at least in part on an input received at the computing system 80. More specifically, in some embodiments, the computing system 80 may provide an interface at the user interface 94 that may facilitate selection, modification, and/or entering of the configuration data 102. Accordingly, the interface may include, one or more interaction points, such as selection fields, free text entry fields, buttons, and/or the like, associated with and the configuration data 102. Further, as described in detail below, after receiving and/or determining the configuration data 102, the computing system 80 may transmit the configuration data 102 to the time-series server 100 (or other suitable database servers).

The computing system 80 may also include application time-series features 104. That is, for example, the computing system 80 may run an application that generates time-series metrics (e.g., time-indexed data) and/or may receive time-series metrics from an application running elsewhere (e.g., in the network 18). Accordingly, the application time-series features 104 may include time-series metrics (e.g., data) and/or suitable logic and/or components to run and/or communicate with the application. In any case, the computing system 80 may transmit time-series metrics associated with the application time-series features 104 to the time-series server 100, where the time-series metrics may be stored. Further, in some embodiments, the time-series metrics may be generated and/or transmitted with a regular periodicity. Accordingly, as described below, a gap between consecutive data points in the time-series metric exceeding a certain duration may be identified for an appropriate response.

Additionally, the computing system 80 may include one or more worker threads 106, which may execute functions and/or perform operations on the computing system 80. In some embodiments, for example, the computing system 80 may use the one or more worker threads 106 to transmit the configuration data 102 and/or the time-series data to the time-series server 100. As described in further detail below, a worker thread 106 may additionally or alternatively receive instruction from the time-series server 100 or execute on data stored on the time-series server 100 to generate a notification at the computing system 80.

Such a generated notification may be sent to a user via, for example, a computing system 80. In such embodiments, the computing system 80 may provide an indication that the notification was received. The indication may be a ring tone, a vibration pattern, a visualization, a reminder, a task, an audio message, or the like. In some embodiments, the notification may activate an application or program stored on the computing system 80, despite the computing system 80 being in a sleep or low power mode, to increase the likelihood that a user will take note of the notification. Further, the notification may be sent via e-mail, text message, application notifications, and/or any other suitable messaging services platform.

In any case, the time-series server 100 may include gap trigger parameters 108, which may be received and/or generated based on information related to the gap trigger configuration data 102 transmitted to the time-series server 100 from the computing system 80. The gap trigger parameters 108 may include the minimum evaluation interval, the maximum evaluation interval, information related to data detected and/or evaluated by the recurring task, and/or the like. Accordingly, in some embodiments, the time-series server 100 may map the information included in the gap trigger configuration data 102, which may be received at the computing system 80, to the gap trigger parameters 108. Further, the gap trigger parameters 108 may include a set of additional evaluation intervals determined based in part on the maximum evaluation interval and the minimum evaluation interval, as described in greater detail below.

The time-series server 100 may further include a processor 82, which may receive the gap trigger parameters 108 and store the gap trigger parameters 108 in a time-series database 110. The time-series server 100 may additionally receive time-series metrics, which may relate to the application time-series features 104, from the computing system 80 and, via the processor, may store the time-series metrics in the time-series database 110.

The time-series database 110 may be a database, such as a virtual database server 44A and/or 44B, configured to receive time-series metrics. That is, for example, the time-series database 110 may receive time-indexed data and may store the data according to and/or with time-indexing of the data. In any case, the time-series database 110 may store the gap trigger parameters 108 and the time-series metrics, among other things, and may maintain any relationships between the information included in the gap trigger parameters 108 and/or between the time-series metrics.

Further, the time-series database 110 may include one or more triggers that may execute an operation in response to a change in a configuration of and/or data included (e.g., stored) in the time-series database 110. For example, in some embodiments, the time-series database 110 may include a gap trigger, which may execute in response to identification of a gap (e.g., a data gap) exceeding and/or meeting a threshold duration between receipt of a last received data point in a time-series metric stored in the time-series database 110 and a current time. Upon executing, the gap trigger may, for example, transmit a notification and/or instructions to generate the notification to the computing system 80 (e.g., to the worker threads 106). As will be described in further detail below, to identify the gap in time-series metric received at the time-series database 110, a recurring task may check for gaps in the time-series metric with a certain periodicity, as may be determined based on the gap trigger parameters 108 and/or the configuration data 102. The recurring task may be implemented as the gap trigger, a scheduled job, and/or the like.

Figure 5:
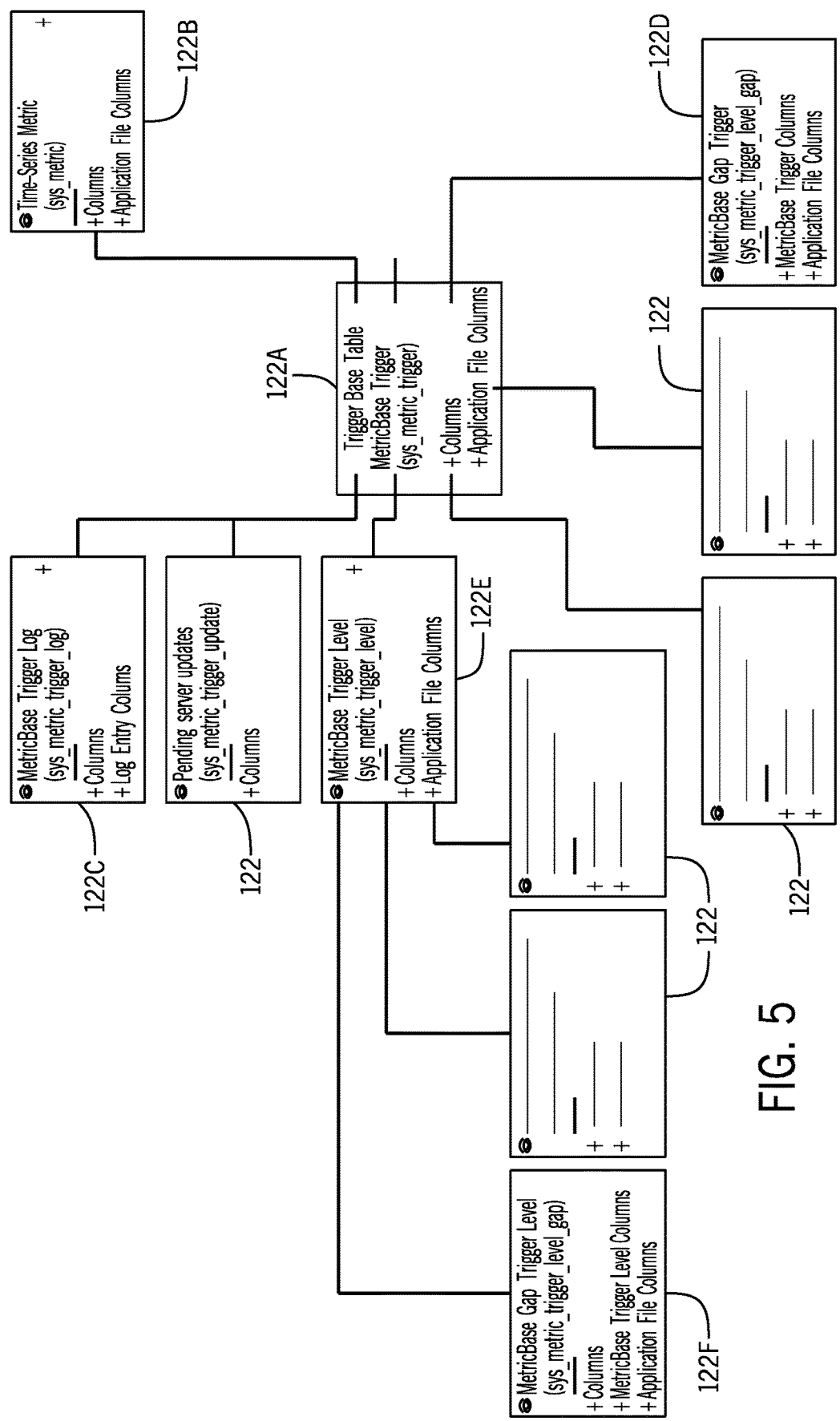
FIG. 5 is a database diagram of a time-series database utilized in the client instance of FIG. 4, in accordance with aspects of the present disclosure.

To better demonstrate the maintenance of relationships of data stored in the time-series database 110, FIG. 5 illustrates a database diagram 120. As shown in the database diagram 120, the time-series database 110 may maintain a number of tables 122 that may each reference one or more other tables 122. In some embodiments, for example, the time-series database 110 may include a trigger base table 122A, which may include entries related to high-level information, such as an identifier, a trigger level, trigger type, and/or a data metric, associated with one or more triggers.

Since the time-series metrics stored in the time-series database 110 may be stored in a time-series metric table 122B, the trigger base table 122A may reference data stored in the time-series metric table 122B in order to, for example, map a trigger to a particular data set, or time-series metric. Further, a trigger log table 122C, which may include a history of actions (e.g., executions) related to a trigger, may include a reference to data, such as an identifier, associated with the trigger in the trigger base table 122A in order to map the history to the trigger.

The trigger type data in the trigger base table 122A may map a trigger stored in the trigger base table 122A to one of a set of trigger type-specific tables, such as a gap trigger table 122D. In such embodiments, the gap trigger table 122D may include, for example, information associated with the gap trigger parameters 108 mapped to a trigger included in the trigger base table 122A. The trigger type may further map a trigger stored in the trigger base table 122A to a trigger level specific to the trigger type (not shown), such as a gap trigger level. The trigger level may indicate a hierarchical level of the trigger based on, for example, the duration of the data gap detected by the gap trigger, as indicated in one or both of the configuration data 102 or the gap trigger parameters. More specifically, the trigger level may map an operation executed by the gap trigger to the duration of the data gap detected by the gap trigger. For example, a gap trigger level may be characterized as low, medium, or high (e.g., level 1, level 2, or level 3, respectively), which may correspond to the detection of a data gap with a small, medium, or large duration, respectively. In such cases, the gap trigger characterized with a low trigger level may, upon execution, generate a first notification, a gap trigger characterized with a medium trigger level may, upon execution, generate a second notification, and a gap trigger characterized with a high trigger level may, upon execution, generate a third notification. In addition to or in the alternative of mapping the trigger levels to a duration of a data gap, in some embodiments, the trigger levels may be mapped to a level of importance and/or severity of data detected by the gap trigger and/or a suitable recurring task.

Additionally or in the alternative, as shown in the illustrated embodiment, the database diagram 120 may include a trigger level table 122E, which may map a trigger stored in the trigger base table 122A to a trigger level, irrespective of the trigger type of the trigger. In such embodiments, a set of trigger type trigger level-specific tables 122F may then map a trigger included in the trigger level table to a trigger type trigger level. In such cases, a trigger type trigger level table 122F, such as the depicted gap trigger level table, may map a trigger level in the trigger level table 122E to an operation specific to the trigger type.

Figure 6:
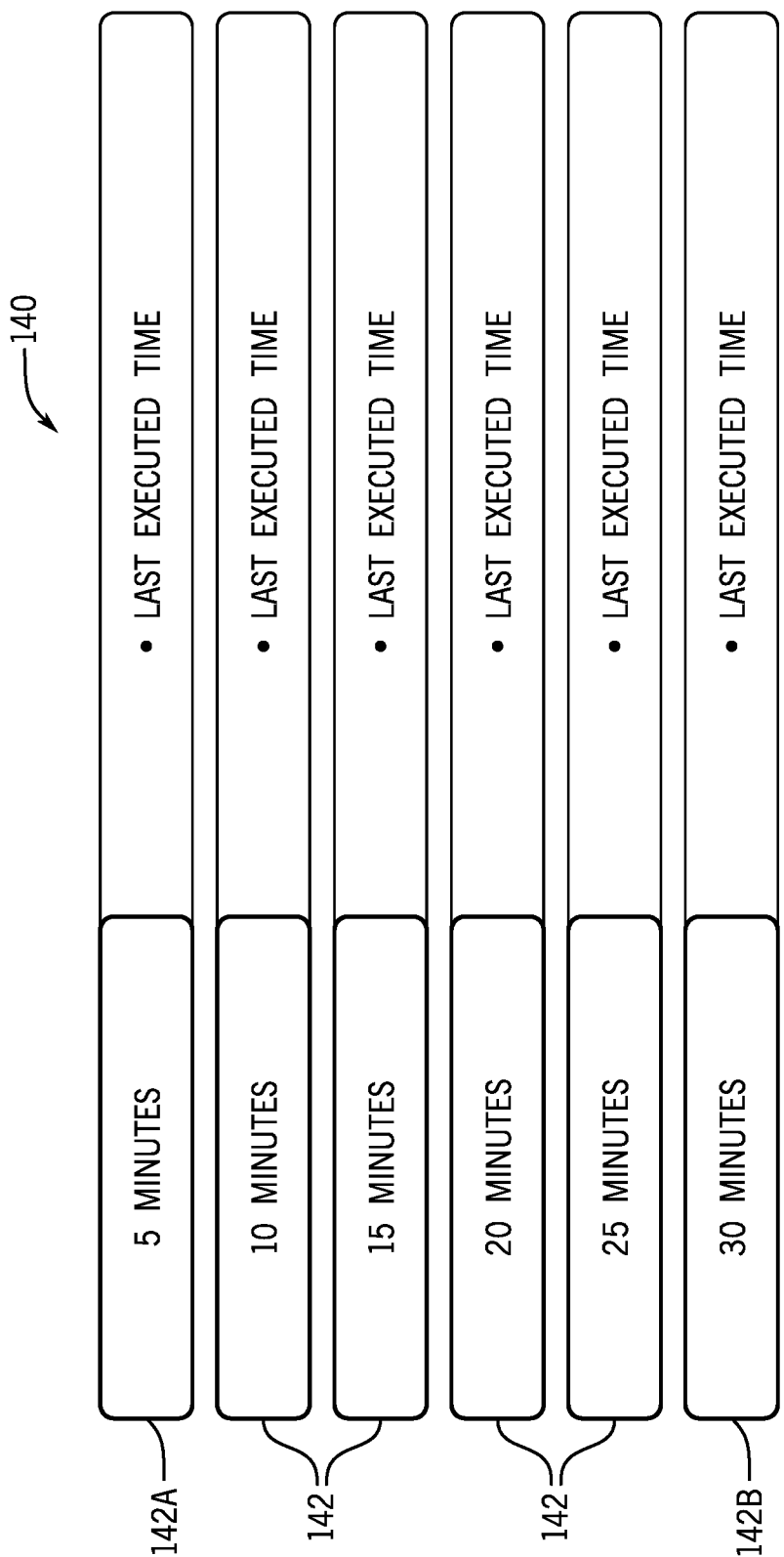
FIG. 6 is a data diagram mapping evaluation intervals at which the recurring task of FIG. 4 is evaluated to a respective last execution time of the recurring task, in accordance with aspects of the present disclosure.

As discussed herein, based on the gap trigger parameters 108, the time-series database 110 may store information related to the minimum interval between task (e.g., trigger) executions (e.g., a minimum evaluation interval) and a maximum interval between task executions (e.g., a maximum evaluation interval). More specifically, as illustrated in the data diagram 140 of FIG. 6, the time-series database 110 and/or the processor 82 may determine a set of evaluation intervals 142 between the minimum evaluation interval 142A and the maximum evaluation interval 142B with a step size of, for example, the minimum evaluation interval 142A. In other embodiments, the step size may be determined based in part on the gap trigger parameters 108, an input received at the time-series server 100 and/or the computing system 80, and/or the like. In any case, the gap trigger parameters 108 may be updated to include the set of evaluation intervals 142.

Further, for each of the evaluation intervals 142, the time-series database 110 may maintain a mapping of the last execution time of the recurring task (e.g., the gap trigger) at that evaluation interval 142. Accordingly, for the illustrated example of a minimum evaluation interval 142A of five minutes and a maximum evaluation interval 142B of thirty minutes, the time-series database 110 may maintain a mapping of six evaluation intervals 142, each five minutes apart, to the last execution time of the gap trigger at respective evaluation interval 142. Such a mapping may be maintained, for example, in a table, a key-value pair, a vector, and/or any suitable data structure in the time-series database 110 and/or in the time-series server 100.

Figure 7:
FIG. 7 is an execution table of the times the recurring task of FIG. 4 is executed for each of the evaluation intervals of FIG. 6.

By maintaining the mapping of evaluation intervals 142 to a respective last executed time, a suitable time for a subsequent execution of a recurring task may be determined. That is, for example, as shown in the execution table 150 of FIG. 7, after running a recurring task with an evaluation interval 142 of five minutes at 10:00, a subsequent execution of the recurring task may be performed at 10:05 based on the last executed time of the recurring task (e.g., 10:00) and the evaluation interval 142 (e.g., five minutes) of the recurring task.

Executing a task may involve performing one or more operations, which may each use resources, such as time and/or logic resources, of the time-series database 110 and/or time-series server 100. In the case of a gap trigger, for example, executing the task (e.g., the gap trigger) may involve determining the last time at which a time-series metric in a suitable data set was stored in the time-series database 110. Based on this last time and a current time, a duration of a data gap in the time-series data, if any, may then be determined. In any case, with an increasing number of data sets stored in the time-series database 110 and/or an increasing number of operations to perform in a task, recurrence of the gap trigger may become increasingly resource intensive and/or cumbersome.

Accordingly, reducing the frequency at which a task is executed may reduce the operations and/or resources used to execute the task. Thus, while the gap trigger may be executed according to the minimum evaluation interval 142, determining a more efficient evaluation interval 142 based on the available evaluation intervals 142, the information related to the data and/or the change in data evaluated by the gap trigger, and/or the like may reduce the operational and/or resource load used to execute the gap trigger.

With the foregoing in mind, FIG. 8 illustrates a data flow diagram 180 for efficiently scheduling a recurring task, such as a gap trigger, in accordance with embodiments described herein. Although the following description of the data flow diagram 180 is described in a particular order, which represents a particular embodiment, it should be noted that the data flow diagram 180 may be performed in any suitable order. Further, certain steps may be skipped altogether, and additional steps may be included in the data flow diagram 180. Moreover, the data flow diagram 180 may be performed on the time-series database 110, the time-series server 100, the computing system 80, or any suitable combination thereof. In some embodiments, for example, the data flow diagram 180 may be illustrative of a scheduler routine, which may run in a single daemon thread on the time-series database 110, the time-series server 100, the computing system 80, or any suitable combination thereof.

As shown in FIG. 8, the minimum evaluation interval 142A and the maximum evaluation interval 142B may be used to determine the set of evaluation intervals 142 available for execution of a recurring task, such as a gap trigger (process block 181). As discussed above, each of the minimum evaluation interval 142A and the maximum evaluation interval 142B may be included in one or both of configuration data 102 or the gap trigger parameters 108. Further, additional information, such as a minimum step size (not shown) between the evaluation intervals 142 may be used to determine the set of evaluation intervals. Additionally or in the alternative, the minimum evaluation interval 142A may be used as the step size between evaluation intervals.

Each of the evaluation intervals 142 may then be mapped to a respective last execution time 182 of the recurring task (e.g., gap trigger) at that evaluation interval 142 (process block 184). The last execution time 182 may be retrieved, for example, from the time-series database 110. In such embodiments, a table 122, such as the trigger log table 122C, may maintain information associated with the task, its executions, one or more evaluation intervals respectively associated with each of the executions of the task, and/or the like so that the last execution time 182 of an evaluation interval 142 may be determined based on the information. Further, upon initialization of an evaluation interval 142, a last execution time 182 may not exist for the evaluation interval 142. In such cases, the task may be executed immediately and the last execution time of the evaluation interval 142 may be updated to the current time. On the other hand, in some embodiments, for an uninitialized evaluation interval 142, the last execution time may be updated to the current time without executing the task, and the task may then be executed after the duration of the evaluation interval 142 has first elapsed.

Information associated with a gap trigger 186 may then be received and used to map the gap trigger to an evaluation interval 142 in the set of evaluation intervals 142 (process block 188). The information associated with the gap trigger 186, or more generally, information associated with a recurring task, may include a set of trigger levels and/or a minimum gap duration (e.g., step size) for the first trigger level and/or between the trigger levels. As discussed above, the operation resulting from execution of a recurring task, such as the gap trigger, may depend on the set of trigger levels. For example, a gap trigger may perform no operation and/or may not be triggered to execute upon identification of a data gap with a duration less than that specified by the minimum gap duration or the first trigger level. On the other hand, upon identification of a data gap with a duration greater than or equal to the first trigger level, the gap trigger may produce a first notification, and upon identification of a data gap with a duration greater than or equal to a second trigger level, the gap trigger may produce a second notification. Additionally or in the alternative, the information associated with the gap trigger 186 may include the gap trigger parameters 108 and/or the configuration data 102.

In some embodiments, a suitable evaluation interval 142 for a gap trigger and/or a recurring task may capture (e.g., detect) each of the trigger levels included in the information associated with the gap trigger 186. That is, for example, the gap trigger and/or recurring task may execute at a frequency suitable to detect a data gap at a first trigger level before the duration of the data gap has reached the second trigger level. Accordingly, to efficiently schedule the gap trigger based on the information associated with the gap trigger 186, the gap trigger may be mapped to an evaluation interval 142 lasting half the duration of the minimum gap duration. As an illustrative example, the received information associated with a gap trigger 186 may indicate that the minimum gap duration is 20 minutes, that a first trigger level is 20 minutes, a second trigger level is 60 minutes, and a third trigger level is 80 minutes. In such cases, each of the 5 minute evaluation interval 142 and the 10 minute evaluation interval 142 may facilitate the gap trigger suitably capturing a data gap at each of the trigger levels above. However, as discussed above, by mapping the gap trigger to the 10 minute evaluation interval 142, the resources and/or time dedicated to evaluating the gap trigger and/or a recurring task may be reduced in comparison with the 5 minute evaluation interval 142. Accordingly, while shorter evaluation intervals 142 may be available to execute the gap trigger with a higher frequency, the gap trigger may more efficiently be scheduled with a longer evaluation interval 142 that is still half the minimum gap duration or shorter.

As discussed above, the evaluation intervals 142 and/or the trigger levels may be configured and/or reconfigured based on an input received at, for example, the computing system 80 (e.g., the interface). Because the gap trigger may be mapped to an evaluation interval 142 based in part on the trigger levels and/or information associated with the gap trigger 186, the configuration and/or reconfiguration of the evaluation intervals 142 may also be based in part on the trigger levels. That is, for example, the range for a minimum evaluation interval 142A provided at the interface may be determined based in part on the minimum gap duration. As such, the duration of the minimum evaluation interval 142A may be selected at the interface from among a set of durations half the duration of the minimum gap duration or shorter. Accordingly, after a user specifies a minimum gap duration and/or an input regarding the minimum gap duration is received at the computing system 80, options to select a minimum evaluation interval 142A via the interface may be limited to evaluation intervals 142 lasting half the duration of the minimum gap duration or shorter. Additionally or alternatively, the available minimum gap duration may be determined based on a selected minimum evaluation interval 142A. In such cases, a user may select a minimum evaluation interval 142A, and afterwards, the user may select, via the interface, a minimum gap duration that is at least twice the duration of the minimum evaluation interval 142. In any case, the computing system may set a default value for the minimum evaluation interval 142A and/or the minimum gap duration based on a selection of the minimum gap or the minimum evaluation interval 142, respectively.

Mapping the gap trigger to an evaluation interval 142 may involve updating one or more tables in the time-series database 110. For example, the trigger base table 122A may be updated to associate the gap trigger with the evaluation interval 142. Further, the trigger log table 122C may be updated to track this change to the gap trigger. Additionally or alternatively, mapping the gap trigger to an evaluation interval 142 may involve updating a scheduled task to run at the frequency specified by the evaluation interval 142.

After the gap trigger is mapped to an evaluation interval 142, the gap trigger may be maintained as a mapped gap trigger 190, and as the time-series database 110 and/or the time-series server 100 may include one or more gap triggers, the mapped gap trigger 190 may be included in a set of mapped gap triggers. Maintaining each of the mapped gap triggers 190 may involve updating the mapped gap trigger 190 in response to changes in, for example, the information associated with the gap trigger 186, the evaluation intervals 142, and/or the like. In some embodiments, because the information associated with the gap trigger 186 and/or the evaluation intervals 142 may be configured and/or reconfigured during runtime of the scheduler routine, these changes may be received as an input to the time-series server 100, the time-series database 110, the computing system 80, and/or the like. Further, as described in detail below, any of these configuration changes received in an input may affect and/or modify additional information in the time-series server 100 and/or the time-series database 110. That is, for example, a mapped gap trigger 190 may be mapped to a new evaluation interval 142 at runtime, among other changes.

Further, each of the mapped gap triggers 190 may be ready for evaluation or execution at a respective evaluation interval 142. Accordingly, at the respective evaluation interval 142, a mapped gap trigger 190 may be evaluated, for example, against a time-series metric 194 received at the time-series database 110 (process block 192). In some embodiments, evaluating the mapped gap trigger 190 may involve determining whether a data gap exists in the time-series metric stored in the time-series database 110. To do so, the mapped gap trigger 190 may determine the last (e.g., most recent) time stamp and/or time index of time-series metric stored in the time-series database 110 by for example, accessing the time-series metric table 122B. The mapped gap trigger 190 may then compare the time stamp to a current system time, for example, in the time-series database 110, to determine a duration of a data gap, if one exists. Further, the mapped gap trigger 190 may compare the duration of an identified data gap to one or more of the trigger levels, which may be included in the trigger level table 122E, to determine whether and/or how to respond to the identified data gap.

Evaluating a mapped gap trigger 190 may further involve iterating through multiple data sets (e.g., metrics) of the time-series metrics 194. That is, for example, a single mapped gap trigger 190 may be used to evaluate each of a first time-series metric and a second time-series metric at a first evaluation interval 142. Further, an additional mapped gap trigger 190 may be used to evaluate a second set of one or more time-series metrics at a second evaluation interval 142. Additionally or in the alternative, a first mapped gap trigger 190 may be used to evaluate a first time-series metric at a first evaluation interval 142 and a second mapped gap trigger 190 may be used to evaluate a second time-series metric at the first evaluation interval 142.

If an identified data gap meets or exceeds the duration of any of the severity levels associated with the mapped gap trigger 190 (decision block 195), the gap trigger may proceed to respond to the identified data gap according to the highest trigger level reached by the duration of the identified data gap (process block 196). Responding to the identified data gap may include for example, generating and transmitting a notification to the computing system 80 and/or transmitting instructions to the computing system 80 so that the computing system 80 may produce a notification related to the identification of the data gap. Further, as discussed above, the gap trigger may respond to a data gap with a first duration meeting or exceeding a first trigger level with a first notification and may respond to a data gap with a second duration meeting or exceeding a second trigger level with a second notification. As the mapped gap trigger 190 is scheduled to run at an evaluation interval 142 suitable to capture each of the trigger levels of the gap trigger, the gap trigger may only respond to the trigger level having the longest duration met or exceeded by the data gap, as the gap trigger may have previously responded according to a trigger level exceeded with a shorter duration.

If, on the other hand, a data gap having a suitable duration is not identified when the gap trigger is evaluated, the gap trigger may not respond to the data gap. In any case, the mapped gap trigger 190 may be reevaluated after a subsequent evaluation interval has elapsed. Accordingly, execution of the mapped gap trigger 190 (process block 192) may further involve updating the map of the evaluation intervals 142 to a last executed time of the gap trigger at the respective evaluation interval 142. Thus, a subsequent execution time of the gap trigger may be determined based on the last executed time of the gap trigger at the evaluation interval 142 and the duration of the evaluation interval 142.

Further, the minimum evaluation interval 142A, the maximum evaluation interval 142B, the information related to the gap trigger 186, and/or the like may be updated during runtime of the scheduler routine by, for example, an input received via the interface. Accordingly, the set of evaluation intervals 142, the mapping of the gap trigger to an evaluation 142, the execution of the gap trigger, and/or the like may be dynamically modified to accommodate such updates during runtime.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
  a client instance hosted by a data center, wherein the client instance is generated for one or more client networks, the client instance comprising a time-series server configured to perform operations stored on an accessible non-transitory, machine-readable medium using a scheduler routine, the operations comprising:
  communicating with a computing device associated with the client instance to receive a minimum evaluation interval, a maximum evaluation interval, and a minimum gap duration for a gap trigger of a time-series metric;
  determining a set of evaluation intervals based on the minimum evaluation interval and the maximum evaluation interval, wherein each evaluation interval of the set of evaluation intervals comprises a frequency for executing the gap trigger subsequent to a last executed time of the gap trigger;
  mapping each of the set of evaluation intervals to the last executed time of the gap trigger at the respective evaluation interval;
  selecting an evaluation interval to minimize overlap of the execution of the gap trigger so as to manage resource utilization;
  mapping the gap trigger to the selected evaluation interval of the set of evaluation intervals based in part on the minimum gap duration;
  evaluating the gap trigger at the selected evaluation interval; and
  generating a notification in response to detecting, using the gap trigger, a gap in the time-series metric exceeding a first gap duration, wherein the first gap duration is greater than or equal to the minimum gap duration.

2. The system of claim 1, wherein the time-series server is further configured to perform acts comprising:

generating a first interface on the computing device, wherein the first interface comprises one or more interaction points through which one or more of the time-series metric, the minimum evaluation interval, the maximum evaluation interval, or the minimum gap duration are selected or entered.

3. The system of claim 2, wherein the time-series server is further configured to perform acts comprising:
in response to receiving a selection of the minimum evaluation interval via the first interface, automatically setting the minimum gap duration to at least twice the duration of the selected minimum evaluation interval.

4. The system of claim 2, wherein the time-series server is further configured to perform acts comprising:
in response to receiving a selection of the minimum gap duration via the first interface, automatically setting the minimum evaluation interval to half the duration of the minimum gap duration or shorter.

5. The system of claim 1, wherein the scheduler routine comprises a single daemon thread.

6. The system of claim 1, wherein the selected evaluation interval is half of the minimum gap duration or shorter.

7. The system of claim 1, wherein the time-series server is further configured to perform acts comprising:
generating an additional notification in response to detecting, using the gap trigger, a second gap in the time-series metric exceeding a second gap duration, wherein the second gap duration is greater than or equal to a sum of the minimum gap duration and the first gap duration.

8. The system of claim 1, wherein a step size between each of the set of evaluation intervals is based on one or both of the minimum evaluation interval or an input received from the computing device.

9. The system of claim 1, wherein the time-series server is further configured to perform acts comprising:
in response to receiving one or both of an updated minimum evaluation interval or an updated maximum evaluation interval during runtime of the scheduler routine:
determining an updated set of evaluation intervals based on one of the updated minimum evaluation interval and the maximum evaluation interval, the minimum evaluation interval and the updated maximum evaluation interval, or the updated minimum evaluation interval and the updated the maximum evaluation interval;
mapping the gap trigger to an additional selected evaluation interval of the updated set of evaluation intervals based in part on the minimum gap duration; and
evaluating the gap trigger at the additional selected evaluation interval.

10. The system of claim 1, wherein the time-series server is further configured to perform acts comprising:
in response to receiving an updated minimum gap duration for the gap trigger during runtime of the scheduler routine:
mapping the gap trigger to an additional selected evaluation interval of the set of evaluation intervals based in part on the updated minimum gap duration;
evaluating the gap trigger at the additional selected evaluation interval; and
generating an additional notification in response to detecting, using the gap trigger, an additional gap in the time-series metric exceeding a second gap duration, wherein the second gap duration is greater than or equal to the updated minimum gap duration.

11. The system of claim 1, wherein the time-series server comprises a time-series database configured to evaluate the gap trigger.

12. The system of claim 1, wherein generating the notification comprises providing, at the computing device, one or more of a ring tone, a vibration pattern, a visualization, a reminder, or an audio message.

13. A non-transitory, computer readable medium comprising instructions, wherein the instructions are configured to be executed by a processor to perform operations comprising:
receiving a minimum evaluation interval, a maximum evaluation interval, and a minimum gap duration for a gap trigger of a time-series metric;
determining a set of evaluation intervals based on the minimum evaluation interval and the maximum evaluation interval, wherein each evaluation interval of the set of evaluation intervals comprises a frequency for executing the gap trigger subsequent to a last executed time of the gap trigger;
mapping each of the set of evaluation intervals to the last executed time of the gap trigger at the respective evaluation interval;
managing resource utilization by selecting an evaluation interval with minimal overlap with evaluation intervals associated with additional gap triggers;
mapping the gap trigger to the selected evaluation interval of the set of evaluation intervals based in part on the minimum gap duration;
evaluating the gap trigger at the selected evaluation interval; and
generating a first notification in response to detecting, using the gap trigger, a first gap in the time-series metric exceeding the minimum gap duration.

14. The non-transitory, computer readable medium of claim 13, wherein the operations comprise:
receiving a first gap duration, wherein the first gap duration is greater than or equal to the minimum gap duration; and
generating a second notification in response to detecting, using the gap trigger, a second gap in the time-series metric exceeding the first gap duration.

15. The non-transitory, computer readable medium of claim 14, wherein the operations comprise:
receiving a second gap duration, wherein the second gap duration is greater than or equal to a sum of the minimum gap duration and the first gap duration; and
generating a third notification in response to detecting, using the gap trigger, a third gap in the time-series metric exceeding the second gap duration.

16. The non-transitory, computer readable medium of claim 14, wherein mapping each of the set of evaluation intervals to the last executed time of the gap trigger at the respective evaluation interval comprises creating or updating a respective key-value pair comprising the respective evaluation interval and the respective last executed time of the gap trigger at the respective evaluation interval.

17. A method to schedule a recurring task, comprising:
determining a minimum evaluation interval, a maximum evaluation interval, and a minimum gap duration for a gap trigger of a time-series metric;
determining a set of evaluation intervals based on the minimum evaluation interval and the maximum evaluation interval, wherein each evaluation interval of the set of evaluation intervals comprises a frequency for executing the gap trigger subsequent to a last executed time of the gap trigger;

mapping each of the set of evaluation intervals to the last executed time of the gap trigger at the respective evaluation interval;
selecting an evaluation interval to minimize overlap of the execution of the gap trigger so as to manage resource utilization;
mapping the gap trigger to the selected evaluation interval of the set of evaluation intervals based in part on the minimum gap duration;
evaluating the gap trigger at the selected evaluation interval; and
generating a notification in response to detecting, using the gap trigger, a gap in the time-series metric exceeding a first gap duration, wherein the first gap duration is greater than or equal to the minimum gap duration.

18. The method of claim 17, comprising:
after evaluating the gap trigger at the selected evaluation interval, updating the last executed time mapped to the selected evaluation interval to a current time.

19. The method of claim 17, wherein evaluating the gap trigger comprises detecting data of the time-series metric.

20. The method of claim 17, wherein the gap trigger comprises one or more of a database trigger or a scheduled task.

\* \* \* \* \*